(12) United States Patent
Takeshita et al.

(10) Patent No.: US 7,762,105 B2
(45) Date of Patent: Jul. 27, 2010

(54) BACKUP STRUCTURE FOR AN UPRISING PIPE OR DOWNFALLING PIPE IN A VACUUM DEGASSING APPARATUS

(75) Inventors: Shinji Takeshita, Amagasaki (JP); Kazuhiko Ishimura, Amagasaki (JP); Sei Nagano, Yokohama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/955,939

(22) Filed: Dec. 13, 2007

(65) Prior Publication Data
US 2008/0120997 A1    May 29, 2008

Related U.S. Application Data

(63) Continuation of application No. PCT/JP2006/306960, filed on Mar. 31, 2006.

(30) Foreign Application Priority Data
Jun. 28, 2005    (JP)    ............... 2005-188121

(51) Int. Cl.
C03B 5/18    (2006.01)
C03B 5/20    (2006.01)
C03B 5/182   (2006.01)
C03B 5/167   (2006.01)

(52) U.S. Cl. ............... 65/134.2; 65/134.1; 65/134.9
(58) Field of Classification Search ............... 65/134.1, 65/134.2, 134.9
See application file for complete search history.

(56) References Cited

U.S. PATENT DOCUMENTS 5,776,397 A * 7/1998 Kuroda et al. ............... 264/161
5,851,258 A   12/1998 Ando et al.
6,286,337 B1  9/2001 Palmquist
2003/0051509 A1 3/2003 Sakai et al.

FOREIGN PATENT DOCUMENTS

JP    9-59028 A     3/1997
JP    9-59029 A     3/1997
JP    2002-87826 A  3/2002
JP    2003-160340 A 6/2003

OTHER PUBLICATIONS

Donald W Freitag, Opportunities for Advanced Ceramics to Meet the Needs of the Industries of the Future, Dec. 1998, US Advanced Ceramics Association, pp. 6-1-6-19.*
K. H. Jurgen Buschow, Encyclopedia of Materials: Science and Technology, "Nickel-based Superalloys: Alloying", 2001, Elsevier, vol. 1, p. 6146-6149.*
Azom, "Zirconia ZrO2—Grades, Mechanical, Thermal, and Electrical Properties", http://www.azom.com/details.asp?ArticleID=3272.*

* cited by examiner

Primary Examiner—Steven P Griffin
Assistant Examiner—Cynthia Szewczyk
(74) Attorney, Agent, or Firm—Oblon, Spivak, McClelland, Maier & Neustadt, L.L.P.

(57) ABSTRACT

A backup structure for an uprising pipe or a downfalling pipe of a vacuum degassing apparatus including the uprising pipe, a vacuum degassing vessel and the downfalling pipe, comprises the uprising pipe or the downfalling being made of platinum or a platinum alloy and having refractory bricks disposed therearound; and the refractory bricks having a thermal expansion relief member disposed on a top end thereof, the thermal expansion relief member comprising a material selected from a metal material and a ceramic material having a creep strength (JIS Z2271: 1993) of 35 MPa or above at 760° C.

22 Claims, 3 Drawing Sheets

BACKUP STRUCTURE FOR AN UPRISING PIPE OR DOWNFALLING PIPE IN A VACUUM DEGASSING APPARATUS

BACKGROUND OF THE INVENTION

1. Field of the Invention

The present invention relates to a backup structure for an uprising pipe or downfalling pipe in a vacuum degassing apparatus, more specifically a backup structure for an uprising pipe or downfalling pipe made of platinum or a platinum alloy in a vacuum degassing apparatus. The present invention also relates to a vacuum degassing apparatus and a vacuum degassing method using the above-mentioned backup structure as the backup structure for an uprising pipe or downfalling pipe.

2. Description of the Related Art

FIG. 3 is a cross-sectional view showing a general structure of vacuum degassing apparatuses. The vacuum degassing apparatus 100 shown in FIG. 3 is used to depressurize and degas molten glass G in a melting tank 200 and continuously feed the degassed molten glass to a subsequent treatment bath. The vacuum degassing apparatus 100 shown in FIG. 3 includes a vacuum degassing vessel 102 formed in a cylindrical shape. The vacuum degassing vessel is housed in a vacuum housing 101 so that the longitudinal axis of the vacuum degassing vessel extends in the horizontal direction. The vacuum degassing vessel 102 has an uprising pipe 103 mounted to a lower surface of one end thereof so as to vertically extend and a downfalling pipe 104 mounted to a lower surface of the other end thereof. Each of the uprising pipe 103 and the downfalling pipe 104 is partly housed in the vacuum housing 101. In the vacuum housing 101, the vacuum degassing vessel 102, the uprising pipe 103 and the downfalling pipe 104 are surrounded by a thermal insulating material 107, such as insulating bricks, in order to be covered for thermal insulation.

Each of the uprising pipe and the downfalling pipe of the vacuum degassing apparatus comprises a hollow tube made of platinum or a platinum alloy, such as a platinum/gold alloy or a platinum/rhodium alloy. Since platinum and a platinum alloy are expensive materials, it is desired to make the hollow tube as thin as possible. For this reason, hollow tubes made of platinum or a platinum alloy are usually surrounded by backup structures so that the backup structures give a sufficient mechanical strength to the hollow tubes.

With regard to the backup structure for a conduit used for a molten substance having a high temperature, Patent Document 1 identified below has disclosed a backup structure for an uprising pipe and a downfalling pipe of a vacuum degassing apparatus. Patent Document 1 has disclosed a supporting device for supporting the backup structure for each of the uprising pipe and the downfalling pipe, which includes a supporting plate and a push-up means. The supporting plate is formed in a rectangular shape and is fixed to a lower portion of the uprising pipe. The supporting plate has insulating bricks put thereon so that the insulating bricks are disposed around the uprising pipe so as to cover the uprising pipe.

The push-up means urges the supporting plate upwardly by utilizing the urging force of a coil spring, with the result that the insulating bricks put on the supporting plate are pushed up to bring the top end of the insulating bricks into contact with a pressing plate. This arrangement can support the uprising pipe and the insulating bricks disposed around the uprising pipe. The purpose of the push-up means is to prevent a gap from being formed between adjacent bricks by a thermal expansion difference caused between a platinum uprising pipe or a platinum downfalling pipe and insulating bricks at the time of heating up the vacuum degassing apparatus, for example. If a gap is formed between adjacent bricks, the platinum uprising pipe or the platinum downfalling pipe is broken in some cases. For this reason, a gap is prevented from being formed between adjacent bricks by utilizing the push-up means to push up the bricks to bring the top end of the insulating bricks into contact with the pressing plate.

Patent Document 1 has disclosed that the backup structure has annular flanges (projections) disposed around the uprising pipe at certain intervals h in a vertical direction, and that the bricks are stacked around the uprising pipe so as to sandwich a flange between an upper brick and a lower brick which are adjacent to each other. The elongation of a portion of the uprising pipe between flanges, which are adjacent to each other in the vertical direction, is greater than that of the brick disposed between the adjacent bricks since the platinum uprising pipe has a higher thermal expansion rate than the insulating bricks. The bricks restrain the uprising pipe from elongating in the axial direction thereof, with the result that the uprising pipe is inwardly bent and deformed in a curved shape or a sinuous shape. In this manner, the elongation of the entire uprising pipe in the axial direction becomes equal to the elongation of the stacked bricks. Accordingly, the thermal expansion difference between the uprising pipe and the bricks is distributed in the portions between flanges, which are adjacent to each other in the vertical direction. The amount of bending deformation of the thermally expanded uprising pipe is uniformly distributed in adjacent flanges, with the result that the amount of bending deformation of the uprising pipe is minimized. Patent Document 1 has disclosed that the insulating bricks comprise, e.g., zirconia-based fused cast refractories, and that the zirconia-based fused cast refractories have a corrosion resistance to molten glass G. In the explanation stated above, the reference numerals referred to in Patent Document 1 are used.

Patent Document 1: JP-A-9-059028

SUMMARY OF THE INVENTION

The inventors have found that the backup structure disclosed by Patent Document 1 may have a problem of elongation caused by the thermal expansion of insulating bricks disposed around the uprising pipe and the downfalling pipe thereof.

As stated above, the backup structure disclosed by Patent Document 1 is configured so that the flanges are disposed around the uprising pipe at certain intervals in the vertical direction to distribute the thermal expansion difference between the platinum uprising pipe and the insulating bricks, wherein the elongation of the entire uprising pipe in the axial direction is equal to the elongation of the insulating bricks 28A stacked around the uprising pipe.

In the backup structure disclosed by Patent Document 1, the insulating bricks are urged upwardly by the push-up means, with the result that the elongation of the insulating bricks is applied to the pressing plate, with which the top end of the insulating bricks is brought into contact. The pressing plate serves the function of receiving the elongation of the insulating bricks and relieving the elongation downwardly. If the insulating bricks are elongated to reach the vacuum degassing vessel disposed above the pressing plate, it is likely that the vacuum degassing vessel is broken. For this reason, the pressing plate is welded to the vacuum housing.

Fused cast refractories have been most widely utilized as refractories for glass furnaces because of having a heat resistance and a corrosion resistance to is molten glass. For this reason, fused cast refractories have been considered to be suited for the backup structure for the uprising pipe and the downfalling pipe of a vacuum degassing apparatus. However, fused cast refractories have a higher thermal expansion rate than insulating refractory bricks and general refractory bricks. When the backup structure disclosed by Patent Document 1 comprises fused cast refractories as the insulating bricks, the elongation caused by thermal expansion becomes greater in comparison with a case where the insulating bricks comprise insulating refractory bricks and general refractory bricks. In addition, since fused cast refractories are excellent in mechanical strength, such as compressive strength, it is likely that the pressing plate is broken when the elongation of the fused cast refractories is applied to the pressing plate.

It is an object of the present invention to provide a backup structure for an uprising pipe or downfalling pipe in a vacuum degassing apparatus, which is capable of avoiding a case where the elongation of refractory bricks caused by thermal expansion breaks or deforms a structure for relieving the elongation of the refractory bricks, a vacuum degassing apparatus using the backup structure, and a method for depressurizing and degassing molten glass by using the vacuum degassing apparatus.

In order to attain the above-mentioned object, the present invention provides a backup structure for an uprising pipe or a downfalling pipe of a vacuum degassing apparatus including the uprising pipe, a vacuum degassing vessel and the downfalling pipe, comprising the uprising pipe or the downfalling being made of platinum or a platinum alloy and having refractory bricks disposed therearound; and the refractory bricks having a thermal expansion relief member disposed on a top end thereof, the thermal expansion relief member selected from a metal material and a ceramic material comprising a material having a creep strength (JIS Z2271: 1993) of 35 MPa or above at 760° C. (hereinbelow, referred to as "the backup structure according to the present invention"). In the present invention, the backup structure for the uprising pipe or the downfalling pipe means the backup structure for one or both of the uprising pipe or the downfalling pipe.

In the backup structure according to the present invention, it is preferred that the refractory bricks have a thermal linear expansion rate (JIS R2207: 2003) of 0.5% or above at 1,500° C. and a compressive strength (JIS R2206: 2003) of 150 MPa or above.

In the backup structure according to the present invention, it is preferred that each of the refractory bricks comprise a material selected from the group consisting of an alumina-based fused cast refractory, a zirconia-based fused cast refractory, an alumina/zirconia/silica (AZS)-based fused cast refractory.

In the backup structure according to the present invention, it is preferred that the thermal expansion relief member comprise a Ni alloy.

The present invention also provides a vacuum degassing apparatus including the backup structure according to the present invention.

The present invention also provides a method for vacuum-degassing molten glass by using a vacuum degassing apparatus including an uprising pipe, a vacuum degassing vessel and a downfalling pipe, comprising using the backup structure according to the present invention to form a backup structure for the uprising pipe or the downfalling pipe in connection with the vacuum degassing vessel.

In accordance with the backup structure of the present invention, when refractory bricks, which are disposed around the uprising pipe or the downfalling pipe of the vacuum degassing apparatus, are thermally expanded, it is possible to prevent the thermal expansion relief member from being broken or deformed by the elongation of the refractory bricks.

The refractory bricks used in the backup structure according to the present invention are excellent in heat resistance. Accordingly, the temperature for heating the vacuum degassing apparatus is not limited based on the refractory bricks disposed around the uprising pipe or the downfalling pipe. The refractory bricks used in the backup structure according to the present invention are also excellent in corrosion resistance to molten glass. Accordingly, even if molten glass leaks from the uprising pipe or the downfalling pipe, it is unlikely that the refractory bricks are significantly eroded by the molten glass. Further, it is unlikely that the joint between adjacent refractory bricks becomes wider even under a high temperature circumstance during operation or even at the time of heating-up.

The vacuum degassing apparatus according to the present invention cause no problems of breaking or deforming the thermal expansion relief member during heating-up or operation, and widening the joint between adjacent refractory bricks because of using the backup structure according to the present invention as the backup for the uprising pipe or the downfalling pipe. The vacuum degassing apparatus according to the present invention can be used for a long term without exchanging, e.g., the thermal expansion relief member or refractory bricks for a new one. Accordingly, the vacuum degassing apparatus according to the present invention can be used to improve the productivity of glass and to reduce the production cost of glass.

The vacuum degassing apparatus according to the present invention can set the heating temperature at an optimum temperature in consideration with degassing characteristics, flow characteristics of molten glass or another factor since the temperature is not limited based on the refractory bricks disposed around the uprising pipe or the downfalling pipe.

DETAILED DESCRIPTION OF THE INVENTION

Figure 1:
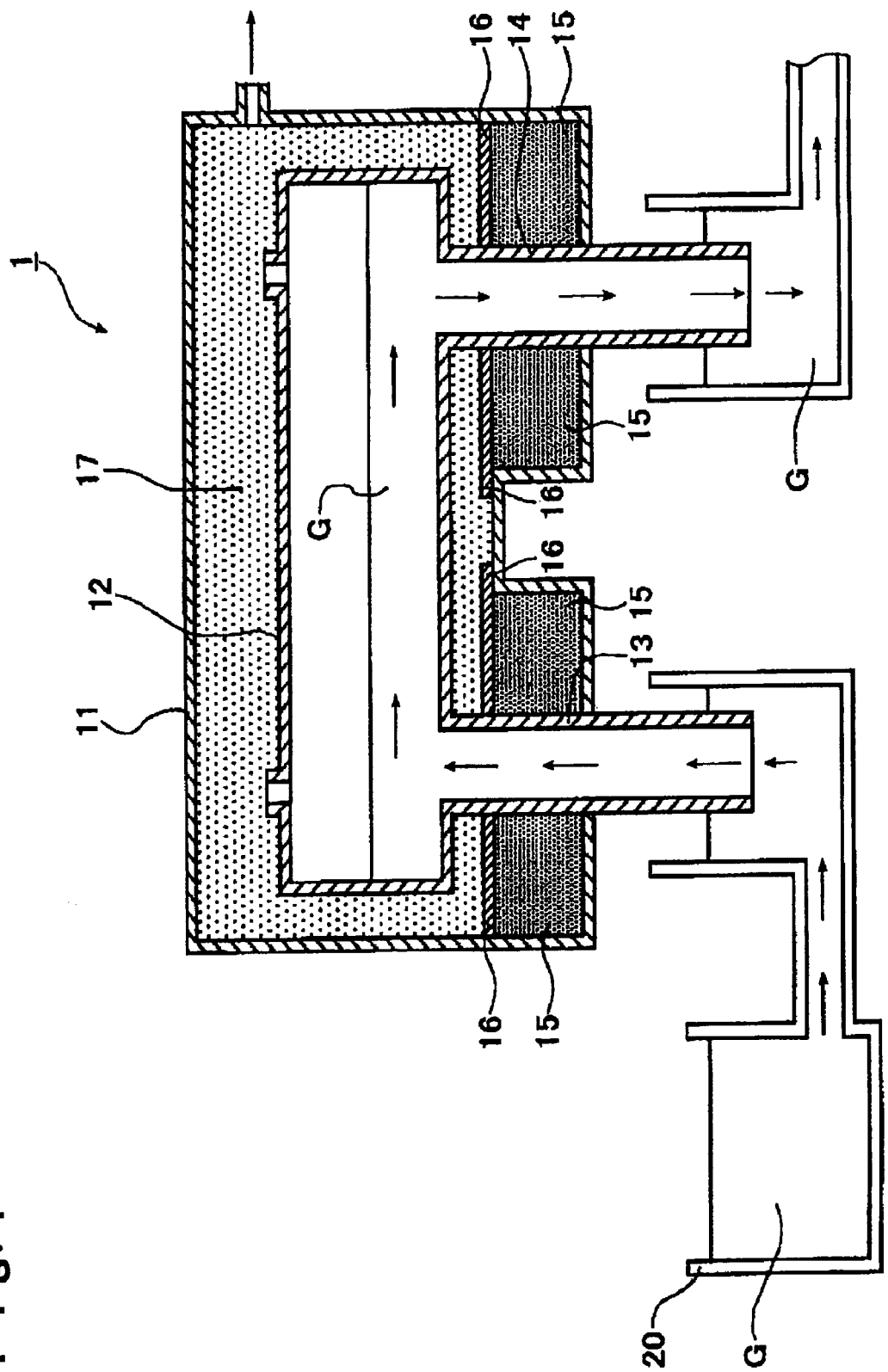
FIG. 1 is a cross-sectional view of a vacuum degassing apparatus including a backup structure according to the present invention.

Now, the present invention will be described in reference to the accompanying drawings. FIG. 1 is a cross-sectional view of a vacuum degassing apparatus including a backup structure according to the present invention. The vacuum degassing apparatus 1 shown in FIG. 1 is used in a process where molten glass G in a melting tank 20 is depressurized and degassed and is continuously fed to a subsequent treatment bath.

The vacuum degassing apparatus 1 includes a vacuum housing 11, which is kept in a depressurized state during operation. The vacuum housing 11, which is made of stainless steel, generally has a cylindrical vacuum degassing vessel 12 housed therein so that the longitudinal axis of the vacuum degassing vessel extends in the horizontal direction. The vacuum degassing vessel 12 has an uprising pipe 13 mounted to a portion of a lower surface thereof adjacent one lateral end thereof so as to vertically extend and a downfalling pipe 14 mounted to a portion of the lower surface thereof adjacent the other end thereof. Each of the uprising pipe 13 and the downfalling pipe 14 is partly housed in the vacuum housing 11.

Each of the vacuum degassing vessel 12, the uprising pipe 13 and the downfalling pipe 14 in the vacuum degassing apparatus 1 comprises a hollow tube made of platinum or a platinum alloy.

Examples of the platinum alloy include a platinum/gold alloy and a platinum/rhodium alloy. A reinforced platinum produced by dispersing a metal oxide into platinum or a platinum alloy is also applicable. Examples of the dispersed metal oxide include metal oxides of Groups III, IV and XIII in the Periodic Table, represented by $Al_2O_3$, $ZrO_2$ or $Y_2O_3$.

Each of the uprising pipe 13 and the downfalling pipe 14 has refractory bricks 15 disposed thereon. The refractory bricks are heated to 1,000 to 1,500° C. at the time of operating the vacuum degassing apparatus 1.

For this reason, the refractory bricks 15 need to be excellent in heat resistance. Each of the uprising pipe 13 where the molten glass G flows upward, and the downfalling pipe 14 where the molten glass flows downward is subjected to a large pressure on the inner wall surface thereof by the molten glass G flowing therethrough. When operating the vacuum degassing apparatus 1, the molten glass G leaks out of the uprising pipe 13 or the downfalling pipe 14 in some cases. From this point of view, the refractory bricks 15 also need to be excellent in corrosion resistance to molten glass. For this reason, the backup structure according to the present invention is characterized in that the refractory bricks 15 disposed around the uprising pipe 13 and the downfalling pipe 14 comprise refractory bricks having a thermal linear expansion coefficient in a specific range and a compressive strength in a specific range. The thermal linear expansion coefficient and the compressive strength of the refractory bricks 15 will be described in detail later.

The refractory bricks 15 have a thermal expansion relief member 16 disposed on each of the top ends thereof to receive the elongation of the refractory bricks 15 caused by thermal expansion and to relieve the expansion downwardly. The vacuum degassing vessel 12 in the vacuum housing 11 normally has insulating refractory bricks or general refractory bricks disposed as a heat-insulating material 17 therearound.

Figure 2:
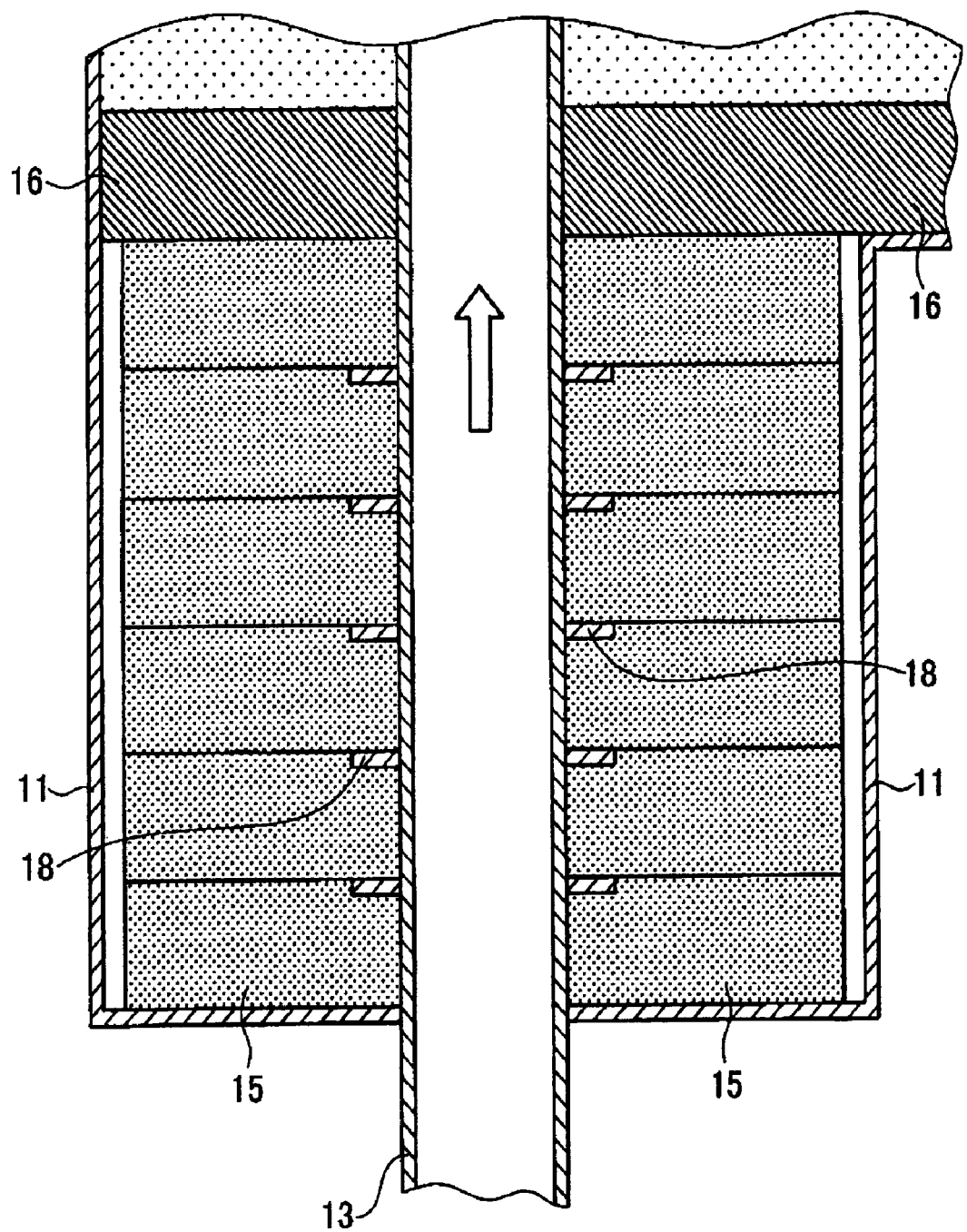
FIG. 2 is an enlarged view of a portion of the uprising pipe and a backup structure for the uprising pipe in the vacuum degassing apparatus shown in FIG. 1.
Figure 3:
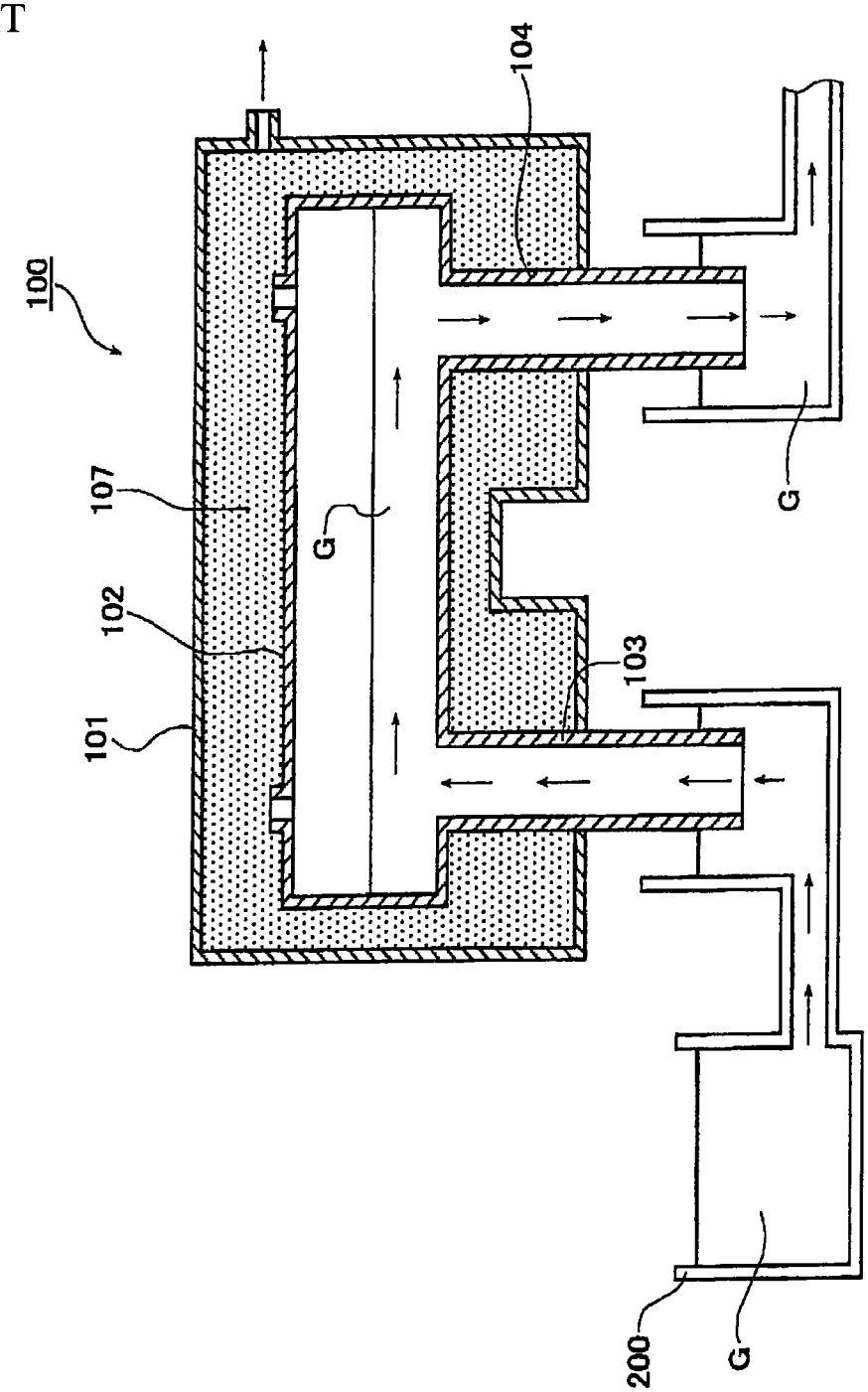
FIG. 3 is a cross-sectional view showing a general structure of vacuum degassing apparatuses.

FIG. 2 is an enlarged view showing a portion of the uprising pipe 13 in the vacuum housing 11 shown in FIG. 1. Although the following explanation will be made about the backup structure for the uprising pipe 13, the backup structure for the downfalling pipe 14 has a similar structure.

Referring to FIG. 2, the uprising pipe 13 has annular flanges (projections) 18 disposed around the outer periphery thereof at certain intervals in the longitudinal direction thereof. The uprising pipe 13 has the refractory bricks 15 stacked therearound along the longitudinal direction thereof, and adjacent refractory bricks 15, which are stacked along the longitudinal direction of the uprising pipe 13, have a flange 18 of the uprising pipe 13 sandwiched therebetween. Comparing the uprising pipe 13 made of platinum or a platinum alloy with the refractory bricks 15, the uprising pipe 13 has a higher thermal expansion rate than the refractory bricks 15. When operating the vacuum degassing apparatus 1, the uprising pipe 13 has a larger elongation due to thermal expansion than the refractory bricks 15. In the backup structure shown in FIG. 2, the difference in the elongation caused between the uprising pipe 13 and the refractory bricks 15 by thermal expansion is dispersed between adjacent flanges 18. Thus, the elongation of the entire uprising pipe 13 in the longitudinal direction becomes equal to the elongation of the refractory bricks 15 disposed around the uprising pipe 13.

On the top end of the refractory bricks 15 disposed around the uprising pipe 13, the thermal expansion relief member 16 is disposed. The thermal expansion relief member 16 is brought into contact with the refractory brick 15 at the highest position. The thermal expansion relief member receives the elongation of the refractory bricks 15 caused by thermal expansion and relieve the expansion downwardly when operating the vacuum degassing apparatus 1. For this purpose, the thermal expansion relief member 16 is welded to the vacuum housing 11.

The refractory bricks 15 disposed around the uprising pipe 13 have a thermal linear expansion rate (JIS R2207: 2003) of 0.5% or above, preferably 0.7% or above, at 1,500° C. and a compressive strength (JIS R2206: 2003) of 150 MPa or above. It is preferred that the compressive strength be 250 MPa or above. It is preferred that the thermal linear expansion rate at 1,500° C. be 5% or below, particularly 3% or below, and that the compressive strength be 700 MPa or below, particularly 500 MPa or below.

Refractory bricks having a thermal linear expansion coefficient of 0.5% or above at 1,500° C. and a compressive strength of 150 MPa or above are excellent in heat resistance and in corrosion resistance to molten glass since such refractory bricks comprise a dense texture having a low porosity and since its constituent phase forms a stable crystalline texture. The refractory bricks having the above mentioned properties can be extremely finely polished because of having a dense texture. It is possible to form a stacked structure of refractory bricks without forming a gap between adjacent refractory bricks by polishing the contact surfaces of the refractory bricks so as to have a high flatness. For this reason, such refractory bricks are appropriate as the refractory bricks 15 disposed around the uprising pipe 13.

Preferred examples of the refractory bricks having a thermal linear expansion coefficient of 0.5% or above at 1,500° C. and a compressive strength of 150 MPa or above include alumina-based fused cast refractories, such as α-alumina-based fused cast refractories, α,β-alumina-based fused cast refractories and β-alumina-based fused cast refractories, and zirconia-based fused cast refractories, alumina/zirconia/silica (AZS)-based fused cast refractories and other fused cast refractories.

Specific examples of alumina-based fused cast refractories include products available under the name of "MARSNITE A" ("MARSNITE" is a trademark) and products available under the name of MONOFRAX A ("MONOFRAX" is a trademark) as α-alumina-based fused cast refractories, products available under the name of "MARSNITE G", products available under the name of "MONOFRAX M" and products available under the name of "JAGUAR M" ("JAGUAR" is a trademark) as α,β-alumina-based fused cast refractories, and products available under the name of "MARSNITE U", products available under the name of "MONOFRAX H" and products available under the name of "JAGUAR H" as β-alumina-based fused cast refractories.

Specific examples of AZS-based fused cast refractories include products available under the names of "ZIRCONITE 1681", "ZIRCONITE 1691" and "ZIRCONITE 1711" ("ZIRCONITE" is a trademark), products available under the names of "MONOFRAX S3", "MONOFRAX S4" and "MONOFRAX S5", products available under the product names of "UNICOLE 501" and "UNICOLE 1", products available under the product names of "FC 101" and "FC 4101", and products available under the product names of "ZAC 1681" and "ZAC 1711".

Patent Document 1 has disclosed that the insulating refractory bricks preferably comprise zirconia-based fused cast refractories. However, all zirconia-based bricks do not always have a required thermal linear expansion rate or a required compressive strength. For example, although zirconia-based bricks (available under the product name of "X-950"), which contain zirconia at an extremely high purity (about 95 mass %), are excellent in corrosion resistance to molten glass, such zirconia-based bricks have a thermal linear expansion rate of about 0.2 and a compressive strength of about 4 MPa, which are outside the ranges defined by the present invention.

There is no limitation to the refractory bricks 15 disposed around the uprising pipe 13 as long as the refractory bricks have a thermal linear expansion coefficient of 0.5% or above at 1,500° C. and a compressive strength of 150 MPa or above. The refractory bricks may comprise bricks other than fused cast refractories. Specific examples of the refractory bricks 15 other than fused cast refractories include bricks made of seamanite.

When the uprising pipe 13 is seen in a radial direction thereof in FIG. 2, the uprising pipe 13 is shown to have a single layer of refractory brick 15 disposed therearound. This figure merely shows the positional relationship between the uprising pipe 13 and the refractory bricks 15 and does not mean that the uprising pipe 13 always has a single layer of refractory brick 15 disposed therearound as viewed in a radial direction.

In general, the backup structure for the uprising pipe and the downfalling pipe of a vacuum degassing apparatus uses plural refractory bricks having the same composition or plural refractory bricks having different compositions, and the refractory bricks are disposed to be layered along a radial direction of the uprising pipe and the downfalling pipe. In the present invention, the refractory bricks shown in FIG. 2 may comprise plural refractory bricks having the same composition or refractory bricks having different compositions, which are layered along a radial direction of the uprising pipe 13.

The above-mentioned types of refractory bricks are appropriate as the refractory bricks 15 disposed around the uprising pipe 13 because of being excellent in heat resistance and corrosion resistance to molten glass.

However, the above-mentioned types of bricks have a larger elongation due to thermal expansion than insulating refractory bricks or general refractory bricks since the thermal linear expansion rate at 1,500° C. is as large as 0.5% or above. The force that is applied to the thermal expansion relief member 16 by the elongation in the refractory bricks 15 caused by thermal expansion is larger in comparison with a case insulating refractory bricks or general refractory bricks are used. Further, since the compressive strength of the refractory bricks 15 is as high as 150 MPa or above, it is likely that the thermal expansion relief member 16 is broken or deformed when the elongation of the refractory bricks caused by thermal expansion is applied to the thermal expansion relief member 16.

The backup structure according to the present invention is characterized in that the thermal expansion relief member 16 comprises a material selected from a metal material or a ceramic material, which has a creep strength (JIS Z2271: 1993) of 35 MPa or above at 760° C. The value of 35 MPa in creep strength measurement means that when a stress of 35 MPa is applied at 760° C. for 1,000 hours, an elongation of 1% is obtained. In other words, a creep strength of 35 MPa or above at 760° C. means that when a stress of 35 MPa is applied at 760° C. for 1,000 hours, an elongation of 1% or below is obtained.

When the thermal expansion relief member 16 comprises a material selected from a metal material or a ceramic material having a creep strength of 35 MPa or above at 760° C., the thermal expansion relief member 16 has a sufficient creep strength. Accordingly, the thermal expansion relief member 16 can be prevented from being broken or deformed by application of the elongation in the refractory bricks 15.

It is preferred that the thermal expansion relief member 16 comprise a material selected from a metal material or a ceramic material having a creep strength of 60 MPa or above, particularly a creep strength of 100 MPa or above to 1,000 MPa or below at 760° C.

When operating the vacuum degassing apparatus 1, the refractory bricks 15 disposed around the uprising pipe 13 are heated to at a temperature of 1,000 to 1,500° C. At that time, the thermal expansion relief member 16 disposed on the top end of the refractory bricks 15 reaches a temperature of 700 to 1,250° C. The thermal expansion relief member 16 needs to have such a heat resistance that the thermal expansion relief member 16 can withstand the highest temperature experienced thereby when operating the vacuum degassing apparatus.

When the thermal expansion relief member 16 comprises a material selected from a metal material or a ceramic material having a creep strength of 35 MPa or above at 760° C., the thermal expansion relief member can withstand temperatures of 700 to 1,250° C.

The temperature experienced by the thermal expansion relief member 16 at the time of operating the vacuum degassing apparatus 1 varies depending on how the backup structure is formed, such as the number of the refractory bricks 15 disposed in a circumferential direction of the uprising pipe 13, the kind of the refractory bricks 15 and the dimensions of the backup structure. The thermal expansion relief member could reach a temperature of about 700° C. in some cases while the thermal expansion relief member could reach a temperature of 1,250° C. in outer cases. The thermal expansion relief member 16 needs to be formed by selecting such a material that the thermal expansion relief member 16 can withstand the highest temperature actually experienced thereby. In other words, the thermal expansion relief member 16 is not always required to have such a heat resistance to be capable of withstanding a temperature of 1,250° C.

Specific examples of the material forming the thermal expansion relief member 16, i.e. the metal or ceramic material having a creep strength of 35 MPa or above at 760° C. include a Ni alloy available under the name of "INCONEL" (trademark), "HAYNES ALLOY" (trademark) and "HASTELLOY" (trademark), and a Co alloy available under the name of "HAYNES ALLOY" and "STELLITE" (trademark). On the other hand, specific examples of the ceramic material include SiC, alumina, $Si_3N_4$ and $ZrO_2$. Among them, a Ni alloy, particularly a product available under the name of "INCONEL" or "HASTELLOY", is preferred because of being easily available and being excellent in corrosion resistance and easy processing into a structure.

In the backup structure according to the present invention, it is preferred that the refractory bricks 15 disposed around the uprising pipe 13 or the downfalling pipe 14 comprise refractory bricks having a thermal linear expansion rate of 0.5% or above at 1,500° C. and a compressive strength of 150 MPa or above. However, refractory bricks, which have different physical properties from the refractory bricks 15 (in terms of thermal linear expansion rate at 1,500° C. and compressive strength), may be disposed outside the refractory bricks 15.

The reason why refractory bricks having a thermal linear expansion rate of 0.5% or above at 1,500° C. and a compressive strength of 150 MPa or above are used as the refractory bricks 15 is that the refractory bricks 15 are required to be particularly excellent in heat resistance and corrosion resistance to molten glass because of being disposed around the uprising pipe 13. From this point of view, the refractory bricks that are disposed outside the refractory bricks 15 may comprise refractory bricks which is inferior in heat resistance and corrosion resistance to molten glass (hereinbelow, referred to "the other refractory bricks" in some cases). Specific examples of the other refractory bricks include insulating refractory bricks and general refractory bricks.

When the other refractory bricks are disposed outside the refractory bricks 15, there is no limitation to the kind of the other refractory bricks. The other refractory bricks may comprise a material selected from a wide range of insulating refractory bricks or general refractory bricks, which are used as a furnace material or the backup structure. Specific examples of the insulating refractory bricks include bricks made of zircon and bricks made of mullite. Examples of the general refractory bricks include fireclay bricks.

When the other refractory bricks are disposed outside the refractory bricks 15, the other refractory bricks may comprise plural refractory bricks, which have the same composition or different compositions, and which are disposed to be layered along a radial direction of the uprising pipe 13.

When the other refractory bricks are disposed outside the refractory bricks 15, the other refractory bricks are inferior in corrosion resistance to glass having a high temperature in many cases. If molten glass leaks out of the platinum member and reaches one of the other refractory bricks, it is possible that the one refractory bricks is eroded to cause significant damage to the apparatus.

In particular, when the thermal expansion relief member 16 comprises a metal member in such a case, there is a problem that it is difficult to prevent molten glass from oozing out. If molten glass oozes out through the platinum member of the vacuum degassing vessel, the molten glass runs down onto not only the vacuum degassing vessel but also the uprising pipe and/or the downfalling pipe. When the thermal expansion relief member 16 comprises a metal member in that case, it is possible that the metal member as the thermal expansion relief member 16 allows glass to ooze out more easily than the bricks because of being inferior in preventing oozing-out of glass than the bricks.

One of the measures to solve the above-mentioned problem is, e.g. a measure to dispose a flange just above the thermal expansion relief member 16 (not shown in FIG. 2), the flange having a larger diameter than the other flanges. Specifically, it is preferred that the flange disposed just above the thermal expansion relief member have a diameter of about 1.2 to 2 times the diameter of the uprising pipe. When the flange just above the thermal expansion relief member 16 is configured to have a larger diameter than the other flanges, it is possible to minimize the oozing-out of molten glass since the thermal expansion relief member 16 and the flange just the above stick to each other because of both being metal.

Another one of the measures to solve the above-mentioned problem is, e.g. a measures to dispose a ramming material layer between the thermal expansion relief member 16 and the refractory brick just under the thermal expansion relief member 16. The ramming material layer is filled with an extremely dense ramming material and is excellent in corrosion resistance. The ramming material layer serves as preventing the molten glass G from flowing into the joints between adjacent bricks layers and from oozing out behind the joint.

The ramming material used in the present invention comprises a product, which is obtained by mixing refractory aggregates, a curable material and the like to produce a powder refractory material, adding a small amount of water to the powder refractory material, kneading the powder refractory material with the water and filling the kneaded powder refractory material into between the thermal expansion relief member and the refractory brick just under the thermal expansion relief member, and which serves as a ceramic bond to generate a strength by being heated. Examples of the ramming material include an alumina ($Al_2O_3$)-based ramming material, a zirconia/silica ($ZrO_2/SiO_2$)-based ramming material and an alumina/zirconia/silica (AZS: $Al_2O_3/ZrO_2/SiO_2$)-based ramming material. Preferred examples include products available under the name of "CMP-AH" for the alumina-based ramming material, products available under the name of "ZR-2000" for the zirconia/silica-based ramming material and products available under the name of "ZM-2500" for the alumina/zirconia/silica-based ramming material (which are all manufactured by Asahi Glass Company, Limited). Another example of the ramming material is cement, which comprises an alkaline earth inorganic substance, such as alumina slag produced in an iron-making process and containing (mono- or di-)calcium aluminate or calcium silicoaluminate as the main component, (mono- or di-)calcium-aluminate-based alumina cement, silicoalumina cement or high-temperature-calcined magnesia; ultrafine powder made of, e.g. silica, a chromium oxide or alumina; and inert fillers; which has a smaller amount of calcium content and a smaller amount of water required for kneading than the conventional cement, has a high strength and is excellent in heat resistance and erosion resistance; and which has been disclosed by JP-B-57-2666.

Among these examples of the ramming material, it is preferred to use a castable refractory lining called "RAMCRETE" (trademark), which comprises a binder preparing by employing a small amount of active ultrafine powder as the base, instead of the conventional alumina cement. A particularly effective example of the ramming material is one called "low cement type ramming material", which employs ultrafine powder as the base, which can be extremely densely filled by addition of water in a small amount of 3 to 6% to the total volume and by use of a vibrator, and which has excellent physical properties in erosion resistance and heat resistance. A specific preferred example of the ramming material is products available under the name of "WHITERAM" (product name). The reason for, as stated above, using such a ramming material, which has water for kneading in a small amount of 3 to 10%, preferably 3 to 6% of the total volume while normal castable refractory lining has water for kneading in an amount of about 10 to 15% of the total volume is that the ramming material is prevented from being cracked to facilitate the oozing-out of molten glass if the water contained in the ramming material is evaporated at a high temperature. It is preferred that the ramming material comprise one containing, as its main components, the main components of the bricks used in a series of pipes. For example, when fused cast refractories are used, the ramming material preferably comprises products availably under the name of alumina-base "CMP-AH".

After assembling the respective layers of bricks by the above-mentioned method, water is added in a small amount of 3 to 6% of the total volume to a powder ramming material, the ramming material with the water added is thereto is put into the gap between adjacent brick layers, and a bar-shaped vibrator is put into the gap to densely and uniformly fill the ramming material in the gap by utilizing the fluidization of powder caused by vibration. The ramming material is hardened in three or four hours, forming a dense ramming material layer having an excellent corrosion resistance.

Although it is essential that the thermal expansion relief member 16 disposed on the top end of the refractory bricks 15 comprise a material selected from a metal or ceramic material having a creep strength of 35 MPa or above at 760° C. in the backup structure according to the present invention, all portions of the structure shown as the thermal expansion relief member 16 in FIG. 2 do not need to comprise such a material.

The reason why the thermal expansion relief member 16 needs to comprise a material selected from a metal or ceramic material having a creep strength of 35 MPa or above at 760° C. is that the thermal expansion relief member is required to be particularly excellent in creep strength because of being disposed on the top end of the refractory bricks 15 disposed around the uprising pipe 13 and the downfalling pipe 14.

From this point of view, a portion of the thermal expansion relief member 16 to be welded to the vacuum housing 11 in the structure shown as the thermal expansion relief member 16 in FIG. 2 may comprise a metal or ceramic material having a creep strength of less than 35 MPa at 760° C.

The reason why the thermal expansion relief member 16 needs to comprise a material selected from a metal or ceramic material having a creep strength of 35 MPa or above at 760° C. is that the thermal expansion relief member is required to have a sufficient creep strength against the elongation of the refractory bricks 15 caused by thermal expansion, the refractory bricks having a high thermal expansion rate at 1,500° C. and a high compressive strength. If the refractory bricks 15 have the other refractory bricks disposed thereoutside, a portion of the thermal expansion relief member 16 positioning on the top end of the other refractory bricks in the structure shown as the thermal expansion relief member 16 in FIG. 2 may comprise a metal or ceramic material having a creep strength of less than 35 MPa at 760° C.

The structure shown as the thermal expansion relief member 16 in FIG. 2 may comprise first portion made of a material selected from a metal or ceramic material having a creep strength of 35 MPa or above at 760° C. and disposed on the top end of the refractory bricks (the main portion of the thermal expansion relief member), and a second portion made of a metal or ceramic material having a creep strength of less than 35 MPa at 760° C., disposed on the top end of the other refractory bricks outside the refractory bricks 15 and used for connection with the vacuum housing 11 (hereinbelow, referred to as the joint member in some cases), the first portion and the second portions being joined together. In this case, with respect to the metal or ceramic material forming the second portion of the thermal expansion relief member, an example of the metal material is a heat-resistant alloy, such as stainless steel. On the other hand, an example of the ceramic material for the second portion is a dense refractory brick. When the joint member of the thermal expansion relief member is made of stainless steel, it is possible to advantageously absorb the thermal expansion of the refractory bricks 15 to some extent because the stainless steel has an adequate flexibility.

The main portion of the thermal expansion relief member is connected to the joint member by a known method, such as welding, a mechanical connection method using a bolt, a screw or another fixing member.

The backup structure according to the present invention may include another structure effective to the backup structure for the uprising pipe and the downfalling pipe of a vacuum degassing apparatus. As a specific example of such another structure, the backup structure may include, e.g. a structure wherein the top end of the refractory bricks 15 is brought into contact with the thermal expansion relief member 16 by pushing the refractive bricks 15 upwardly by the urging force of, e.g. a coil spring, as in the push-up means disclosed in JP-A-9-59028. As in the vacuum housing disclosed in JP-A-9-59028, the vacuum housing may have an uprising pipe housing portion and a downfalling pipe housing portion formed in a cylindrical bellows structure to absorb the thermal expansion and the shrinkage of the uprising pipe and the downfalling pipe in the longitudinal directions of both pipes.

In the backup structure shown in FIG. 2, the elongation of the refractory bricks is applied to a lower end side of the vacuum housing, in particular a bottom portion of the vacuum housing since the elongation of the refractory bricks 15 caused by thermal expansion is relived downwardly by the thermal expansion relief member 16. In order to cope with the strength poverty of the lower end side of the vacuum housing 11, the lower end side of the vacuum housing 11 may be cooled by disposing a cooling pipe at the lower end side of the vacuum housing 11 and flowing water or air in the cooling pipe. Metal materials, such as stainless steel forming the vacuum housing 11, decreases in mechanical strength as the temperature increases. However, the mechanical strength at the lower end side of the vacuum housing 11, to which the elongation of the refractory bricks 15 is applied, can be prevented from being reduced by disposing the cooling pipe and cooling the lower end as state above.

In the backup structure shown in FIG. 2, there is an empty space existing between lateral circumferential sides of the refractory bricks 15 and the vacuum housing 11. The empty space may have a monolithic refractory, such as a castable refractory, a plastic refractory or a ramming material, filled therein.

In the backup structure according to the present invention, the dimensions of the refractory bricks 15 and the thermal expansion relief member 16 may be properly selected according to the materials forming the refractory bricks and the thermal expansion relief member, the dimensions and the materials of the other elements of the vacuum degassing apparatus 1, such as the uprising pipe 13, the downfalling pipe 14 and the vacuum housing 11, and another factor. For example, the thickness of the thermal expansion relief member 16, which varies on equipment size, is 50 mm or above, preferably 100 mm or above, more preferably 200 mm or above in terms of mechanical strength. The thickness of the thermal expansion relief member 16 is typically and preferably 500 mm.

In order to prevent a temperature difference from being generated between the inside of the vacuum degassing vessel and molten glass supplied from a melting tank, it is preferred that the vacuum degassing vessel be heated so as to have a temperature ranging from 1,150° C. to 1,550° C., in particular from 1,200° C. to 1,400° C. therein. It is preferred in terms of productivity that the molten glass have a flow rate of 1 to 200 ton/day.

When performing the vacuum degassing method, the inside of the vacuum degassing vessel disposed in the vacuum housing is held at a certain depressurized state by using an external vacuum pump or the like to evacuate the inside of the vacuum housing. The inside of the vacuum degassing vessel is depressurized preferably 30 to 460 mmHg (40 to 613 hPa), more preferably 100 to 310 mmHg (133 to 413 hPa).

There is no limitation to the glass degassed by the present invention in terms of composition as long as the glass is produced by heating and melting. The glass may comprise alkali glass, such as borosilicate glass. In particular, the molten glass preferably comprises non-alkali glass, which is difficult to remove bubbles in a refining step, and which is used in an application where the occurrence of defects should be particularly minimized as in, e.g., a glass substrate for display. When the molten glass comprises non-alkali glass, the temperature needs to be increased to some level during vacuum-degassing. Taking it into account, the present invention is more effective for non-alkali glass.

The dimensions of the vacuum degassing vessel may be properly determined according to a used vacuum degassing apparatus, irrespective of whether the vacuum degassing vessel is made of a platinum-based material or a ceramic-based non-metal organic material. Specific examples of the dimensions of the vacuum degassing vessel 12 shown in FIG. 1 are as follows:

Length in the horizontal direction: 1 to 20 mm

Length of one side (when the cross-section is rectangular): 0.1 to 5 mm

Inner diameter (when the cross-section is circular or oval, although the inner diameter means the average diameter for an oval cross-section): 0.1 to 5 mm When the vacuum degassing vessel 12 comprises a platinum-based material, the thickness of the vacuum degassing vessel is preferably 4 mm or below, more preferably 0.5 to 1.2 mm.

The vacuum housing 11 is made of metal, such as stainless steel, and is configured and sized to be capable of housing the vacuum degassing vessel. Each of the uprising pipe 13 and the downfalling pipe 14 comprises a hollow tube having a circular shape in section in general. The dimension of each of the uprising pipe 13 and the downfalling pipe 14 may be properly determined according to a used vacuum degassing apparatus. For example, the dimensions of the uprising pipe 13 and the downfalling pipe 14 may be determined as follows:

Inner diameter: 0.05 to 2 mm, preferably 0.1 to 1 mm (when the hollow tube is rectangular in section, the inner diameter means the length of one side.)

Length: 0.2 to 7 mm, preferably 0.4 to 5 mm

Thickness: 0.4 to 5 mm, preferably 0.8 to 4 mm

EXAMPLE

Now, the present invention will be described more specifically based on an example. It should be noted that the present invention is not limited to the example.

In the example, the vacuum degassing apparatus 1 shown in FIG. 1 was used to vacuum-degas molten glass. The backup structure for each of the uprising pipe 13 and the downfalling pipe 14 in the vacuum degassing apparatus 1 comprised the backup structure shown in FIG. 2.

The dimensions and the material of each element of the vacuum degassing apparatus 1 were as follows:

Vacuum housing 11: Made of stainless steel

Vacuum degassing vessel 12: Made of a platinum/rhodium alloy (90 mass % of platinum and 10 mass % of rhodium)

Dimensions of degassing vessel

Length: 2 m

Inner diameter: 120 mm

Thickness: 1 mm

Uprising pipe 13 and downfalling pipe 14: Made of a platinum/rhodium alloy (90 mass % of platinum and 10 mass % of rhodium)

Dimensions of each of uprising pipe and downfalling pipe

Length: 3 mm

Inner diameter: 80 mm

Thickness: 1 mm

Flanges 18: Made of a platinum/rhodium alloy (90 mass % of platinum and 10 mass % of rhodium)

The flanges, each of which was formed in a doughnuts shape having an inner diameter of 82 mm, an outer diameter of 102 mm and a thickness of 1 mm, were welded to the outer periphery of each of the uprising pipe 13 and the donwfalling pipe 14 at intervals of 300 mm along the longitudinal direction of each of the uprising pipe 13 and the downfalling pipe 14.

The dimensions and the material of each element of the backup structure were as follows:

Refractory bricks 15: AZS-based fused cast refractories, each of which was formed in a doughnuts shape having an inner diameter of 82 mm, an outer diameter of 600 mm and a height of 300 mm, was available under the name of "ZIRCONITE 1711", was manufacture by Asahi Glass Company, Limited, and had a thermal linear expansion rate (JIS R2207: 2003) of 0.8% at 1,500° C. and a compressive strength (JIS R2206: 2003) of 350 MPa, were used and stacked in six layers around each of the uprising pipe and donwfalling pipe in the vacuum housing 11. The thermal insulation material 17 disposed around the vacuum degassing vessel 12 comprised fireclay bricks.

Thermal expansion relief member 16: The thermal expansion relief member comprised a main body made of a product available under the name of "NICONEL" (having a creep strength of 120 MPa at 760° C.), and a stainless steel joint member welded to the main body. The main body of the thermal expansion relief member was formed in a doughnuts shape having an inner diameter of 300 mm, an outer diameter of 600 mm and a thickness of 100 mm. The joint member comprised a frame member formed in a square shape in a plan view and having an opening formed therein. One side of the joint member had a length of 800 mm, and the joint member had a thickness of 100 mm. The main body of the thermal expansion relief member and the joint member were welded to each other. The joint member was welded to the vacuum housing 11. The main body of the thermal expansion relief member was disposed on the top end of the refractory bricks 15.

The molten glass was vacuum-degassed under the following conditions:

Temperature in vacuum degassing vessel 12: 1,400° C.

Pressure in vacuum degassing vessel 12: 180 mmHg (240 hPa)

Molten glass: Non-alkali glass

Flow rate: 1 ton/day

After six months passed since commencement of operation, no damage or deformation was observed in any one of the main body of the thermal expansion relief member and the joint member.

COMPARATIVE EXAMPLE

Vacuum-degassing was conducted by the same structure is as the example except that the main body of the thermal expansion relief member was made of stainless steel (SUS310S) having a creep strength of 32 MPa at 760° C.

After six months passed since commencement of operation, significant deformation was observed in the main body of the thermal expansion relief member.

Since backup structure of the present invention can prevent the thermal expansion relief member from being broken or deformed by elongation of the refractory bricks when the refractory bricks disposed around the uprising pipe or the downfalling pipe of the vacuum degassing apparatus are thermally expanded, the backup structure is applicable to a vacuum degassing apparatus for molten glass.

The entire disclosure of Japanese Patent Application No. 2005-188121 filed on Jun. 28, 2005 including specification, claims, drawings and summary is incorporated herein by reference in its entirety.

What is claimed is:

1. A backup structure for an uprising pipe or a downfalling pipe of a vacuum degassing apparatus including the uprising pipe, a vacuum degassing vessel and the downfalling pipe, comprising:

the uprising pipe or the downfalling pipe being made of platinum or a platinum alloy and having refractory bricks disposed therearound; and the refractory bricks having a thermal expansion relief member disposed on a top end thereof, the thermal expansion relief member comprising a material selected from a metal material and a ceramic material having a creep strength (JIS Z2271: 1993) of 35 MPa or above at 760° C., wherein the refractory bricks are a fused cast refractory having a thermal linear expansion rate (JIS R2207: 2003) of 0.5% or above at 1,500° C., the refractory bricks are stacked in layers, flanges are disposed between adjacent refractory bricks and on a top side of the thermal expansion relief member, and the flange on the top side of the thermal expansion relief member is a larger diameter than the remaining flanges.

2. The backup structure according to claim 1, wherein the refractory bricks have a compressive strength (JIS R2206: 2003) of 150 MPa or above.

3. The backup structure according to claim 1, wherein each of the refractory bricks comprises a material selected from the group consisting of an alumina-based fused cast refractory, a zirconia-based fused cast refractory, an alumina/zirconia/silica (AZS)-based fused cast refractory.

4. The backup structure according to claim 1, wherein the thermal expansion relief member comprises a Ni alloy.

5. The backup structure according to claim 1, wherein a ramming material layer is disposed between the thermal expansion relief member and the refractory brick on a bottom side of the thermal expansion relief member.

6. The backup structure according to claim 5, wherein the thermal expansion relief member and the flange disposed on a top side of the thermal expansion relief member are made of metal.

7. The backup structure according to claim 1, wherein the thermal expansion relief member is connected to a vacuum housing of the vacuum degassing apparatus, and the thermal expansion relief member has a portion for connection with the vacuum housing, the portion comprising stainless steel.

8. The backup structure according to claim 1, wherein the thermal expansion relief member has a thickness of 50 to 500 mm.

9. The backup structure according to claim 1, wherein the thermal expansion relief member and the flange disposed on a top side of the thermal expansion relief member are made of metal.

10. A vacuum degassing apparatus comprising:
an uprising pipe;
a vacuum degassing vessel;
a downfalling pipe; and
a backup structure for the uprising pipe or downfalling pipe,
wherein the uprising pipe or the downfalling pipe is made of platinum or a platinum alloy and having refractory bricks disposed therearound, the refractory bricks have a thermal expansion relief member disposed on a top end thereof, the thermal expansion relief member comprises a material selected from a metal material and a ceramic material having a creep strength (JIS Z2271: 1993) of 35 MPa or above at 760° C., the refractory bricks have a thermal linear expansion rate (JIS R2207: 2003) of 0.5% or above at 1,500° C., the refractory bricks are stacked in layers, flanges are disposed between adjacent refractory bricks and on a top side of the thermal expansion relief member, and the flange on the top side of the thermal expansion relief member is a larger diameter than the remaining flanges.

11. A method for vacuum-degassing molten glass by using the vacuum degassing apparatus defined in claim 10 including the vacuum degassing vessel defined in claim 9, comprising:

heating the inside of the vacuum degassing vessel to a temperature of 1,150° C. to 1,550° C.; and depressurizing the inside of the vacuum degassing vessel to a pressure of 40 to 613 hPa.

12. The vacuum degassing apparatus according to claim 10, wherein a ramming material layer is disposed between the thermal expansion relief member and the refractory brick on a bottom side of the thermal expansion relief member.

13. The vacuum degassing apparatus according to claim 12, wherein the thermal expansion relief member and the flange disposed on a top side of the thermal expansion relief member are made of metal.

14. The vacuum degassing apparatus according to claim 10, wherein the thermal expansion relief member and the flange disposed on a top side of the thermal expansion relief member are made of metal.

15. A backup structure for an uprising pipe or a downfalling pipe of a vacuum degassing apparatus including the uprising pipe, a vacuum degassing vessel and the downfalling pipe, comprising:

the uprising pipe or the downfalling pipe being made of platinum or a platinum alloy and having refractory bricks disposed therearound; and the refractory bricks having a thermal expansion relief member disposed on a top end thereof, the thermal expansion relief member comprising a material selected from a metal material and a ceramic material having a creep strength (JIS Z2271: 1993) of 35 MPa or above at 760° C., wherein the refractory bricks are a fused cast refractory having a thermal linear expansion rate (JIS R2207: 2003) of 0.5% or above at 1,500° C., and a ramming material layer is disposed between the thermal expansion relief member and the refractory brick on a bottom side of the thermal expansion relief member.

16. The backup structure according to claim 15, wherein the refractory bricks have a compressive strength (JIS R2206: 2003) of 150 MPa or above.

17. The backup structure according to claim 15, wherein each of the refractory bricks comprises a material selected from the group consisting of an alumina-based fused cast refractory, a zirconia-based fused cast refractory, an alumina/zirconia/silica (AZS)-based fused cast refractory.

18. The backup structure according to claim 15, wherein the thermal expansion relief member comprises a Ni alloy.

19. The backup structure according to claim 15, wherein the thermal expansion relief member is connected to a vacuum housing of the vacuum degassing apparatus, and the thermal expansion relief member has a portion for connection with the vacuum housing, the portion comprising stainless steel.

20. The backup structure according to claim 15, wherein the thermal expansion relief member has a thickness of 50 to 500 mm.

21. A vacuum degassing apparatus comprising:
an uprising pipe;
a vacuum degassing vessel;
a downfalling pipe; and
a backup structure for the uprising pipe or downfalling pipe,
wherein the uprising pipe or the downfalling pipe is made of platinum or a platinum alloy and having refractory bricks disposed therearound, the refractory bricks have a thermal expansion relief member disposed on a top end thereof, the thermal expansion relief member comprises a material selected from a metal material and a ceramic material having a creep strength (JIS Z2271: 1993) of 35 MPa or above at 760° C., the refractory bricks have a thermal linear expansion rate (JIS R2207: 2003) of 0.5% or above at 1,500° C., and a ramming material layer is disposed between the thermal expansion relief member and the refractory brick on a bottom side of the thermal expansion relief member.

22. A method for vacuum-degassing molten glass by using the vacuum degassing apparatus defined in claim 21 including the vacuum degassing vessel defined in claim 21, comprising:
heating the inside of the vacuum degassing vessel to a temperature of 1,150° C. to 1,550° C.; and
depressurizing the inside of the vacuum degassing vessel to a pressure of 40 to 613 hPa.

* * * * *